DIODE INPUT NOR CIRCUIT INCLUDING POSITIVE FEEDBACK
Filed June 18, 1959
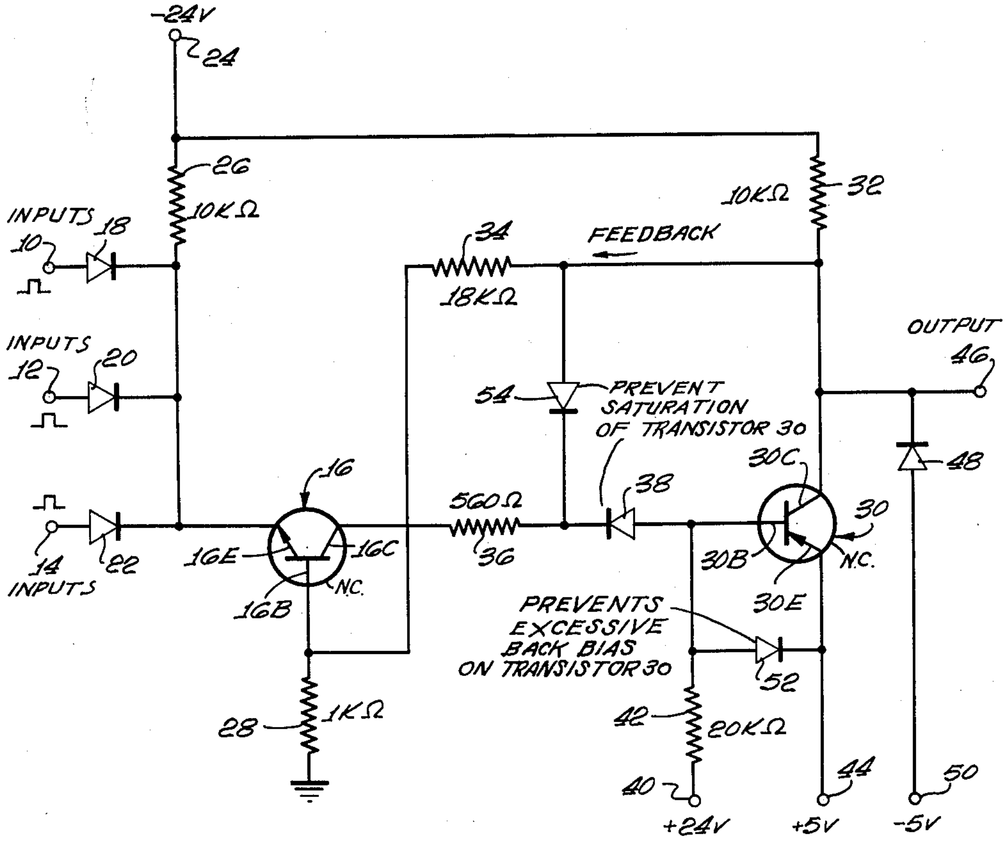
WILLIAM S. KNOWLES
ARTHUR J. ELIAS
INVENTORS.
BY Lyon & Lyon
ATTORNEYS.

3,083,303
Patented Mar. 26, 1963

3,083,303

DIODE INPUT NOR CIRCUIT INCLUDING POSITIVE FEEDBACK

William S. Knowles, Malibu, and Arthur J. Elias, Canoga Park, Los Angeles, Calif., assignors, by mesne assignments, to Ampex Corporation, Redwood City Calif., a corporation of California Filed June 18, 1959, Ser. No. 821,130
5 Claims. (Cl. 307—88.5)

This invention relates to electrical logic circuits and, more particularly, to an improvement therein.

Logic circuits are the elements which circuit designers employ in building up information-handling systems for processing data. One of the basic logic circuits is that known as a "NOR" circuit. This type of circuit has a plurality of inputs, and its function is to provide an output when any one or more than one of its inputs is excited with a signal having a particular polarity. No output is received in the presence of signals of other than those having the specified polarity.

Some of the difficulties experienced in the prior art with this general type of device have been that the amplitude of the input signal has an effect upon the output signal. Thus, where a minimal amplitude signal is necessary, in order to cause the NOR circuit to operate, the output received as a result of the application of signals in the vicinity of the minimal signal may not be suitable for utilization without considerable additional circuitry for shaping and amplification of the output. Further, large pulse current input signals have caused apparatus failures, a correction of which, in a complex information-handling system, can be extremely costly.

An object of this invention is to provide a novel and useful logic circuit.

Another object of the present invention is to provide a logic circuit which has a wide tolerance for different amplitude-input signals.

Yet another object of the present invention is the provision of a novel circuit which provides a uniform output signal, despite variations in amplitude of the input signal.

These and other objects of this invention are achieved in a circuit which comprises a first and a second transistor, one of which is of the NPN type and the other of the PNP type. The circuit interconnections are arranged so that the first and second transistors, in the absence of an input to the circuit, are maintained conductive. An input signal which is applied to one or more of a plurality of diodes connected to the emitter of the first transistor, effectively steers current away from the first transistor emitter, whereby it is rendered nonconductive. This renders the second transistor nonconductive. The output of the second transistor is clamped in a manner so that its output, in the absence of an input signal, does not vary. Further, the output obtained, in the presence of an input signal, is standard and does not vary. By utilizing feedback between the second and first transistor, when the input signal exceeds a threshold value, regardless of any excess thereover, the full value of the output is obtained. In view of the current steering arrangement to the input of the circuit, large current pulses cannot damage the transistors employed.

The novel features that are considered characteristic of this invention are set forth with particularly in the appended claims. The invention itself, both as to its organization and method of operation, as well as additional objects and advantages thereof, will best be understood from the following description when read in connection with the accompanying drawing, which is a circuit diagram of an embodiment of the invention.

Reference is now made to the drawing, which shows a circuit diagram of an embodiment of the invention. This includes a plurality of input terminals 10, 12, 14, to which signals for operating the embodiment of the invention may be applied. Three are shown by way of example only. More or less than this number may be used. A first transistor 16 has an emitter 16E, a collector 16C, and a base 16B. From each one of the input terminals 10, 12, 14, a separate diode 18, 20, 22 is connected to the emitter 16E of the transistor. A terminal 24, to which a negative operating potential is applied, is connected to the emitter 16E through a resistor 26. A resistor 28 connects the base 16B of the transistor 16 to ground or the point of reference potential.

A second transistor 30 also has an emitter 30E, a collector 30C, and a base 30B. A resistor 32 connects the terminal 24 to the collector 30C. Another resistor 34 connects the collector 30C to the base 16B. A resistor 36 in series with a diode 38 connects the collector 16C of the transistor 16 to the base 30B of the transistor 30. A terminal 40 to which a positive operating potential is applied is connected through a resistor 42 to the base 30B of transistor 30. A terminal 44, to which a positive potential is applied, is connected to the emitter 30E of transistor 30. An output terminal 46 is connected to the collector 30C of transistor 30. A clamp diode 48 connects the collector and output terminal 46 to a terminal 50, to which a negative clamp potential is applied.

A diode 52 is connected between the base and emitter of transistor 30 and serves the function of preventing excessive back bias between base and emitter when the transistor 30 is not conducting. It does this by clamping the base to the potential applied to the emitter. A diode 54, connected between the collector 30C and the junction of the connection between resistor 36 and diode 38, in combination with diode 38 and its associated resistors, acts to prevent transistor 30 from becoming saturated by limiting the maximum potential applied to base 30B to maintain the transistor 30 conductive.

In the quiescent state, the transistor 16 is conducting and current flows through the resistor 26 and emitter 16E. Current for collector 16C flows from terminal 44 through the emitter and base of transistor 30 and through diode 38 and current limiting resistor 36. The collector current reduces the potential on the base of transistor 30 to a value sufficiently below the emitter potential to insure that the transistor 30 is also conductive near, but not at, saturation. At this time, the potential on the output terminal 46 is substantially +5 v., the potential being applied to the emitter 30E. Upon the application of a signal to any one or more of the input terminals 10, 12, 14, which signal is positive, and which exceeds a predetermined amplitude as determined by the values chosen for the system components, current instead of flowing into the emitter of the transistor is diverted to flow through the one or more of the diodes 18, 20, 22, to which the input signal is being applied. As a result, the transistor 16 is cut off. When this happens, current for the collector 16C can no longer flow through the transistor 30. The base 30B of the transistor 30 is rapidly rendered positive by the connection through resistor 42 to terminal 40. Transistor 30 is thus rapidly rendered nonconductive also. As previously stated, diode 52 clamps the potential to which the base can rise to +5 v. Current can now flow from the terminal 50 through the diode 48 and resistor 32 to the terminal 24. Diode 48 is a clamp diode and insures that the terminal 46 will be at the potential applied to the diode 48. In the illustration employed herein, this is −5 v. As soon as the signal applied to the input is dropped below the switching level, the circuit immediately snaps back to its standby state with both transistors being conductive.

The values shown in the drawing for the components employed in the embodiment of the invention are by way of illustration of an operative arrangement, and are not to be construed as a limitation upon the invention. Using these values, the voltage at the terminal 46 was +5 v. in the absence of an input signal and was −5 v. in the presence of an input signal. Resistors 34 and 28 serve as a feedback network. The feedback signal which is applied to the base of transistor 16 serves to standardize the transition time of the circuit operation. No matter how slowly the input voltage changes, the output transition of the circuit occurs at full speed. This eliminates the need for further circuitry for squaring the output voltage, such as "Schmitt" trigger circuits, for example. The fact that the input signal is not applied to the first transistor, but instead steers current away from it, acts as a safeguard against harming an expensive transistor.

For the purposes of securing a rapid transition time or circuit operation in response to an input signal, it is preferred that a negative signal be applied to the input terminals during the quiescent, or standby, condition. For the embodiment of the invention shown, this was −5 v. This serves the purpose of maintaining a small current flowing through the diodes, whereby their inherent capacitance is charged and does not delay their response to an input signal. From the symbol employed in the circuit diagram, it will be noted that the first transistor is of the NPN type, whereas the second transistor is of the PNP type. This should not be construed as a limitation upon the invention, since those skilled in the art will readily be able to interchange the types of transistors employed, as well as the necessary bias voltages and diode connections without departing from the spirit and scope of this invention. It should also be noted that although this invention is described as a NOR circuit, this should not be construed as a limitation upon the invention since it also can perform the same functions as, for example, a Schmitt trigger circuit; that is, in response to a small or slowly changing input, which exceeds a predetermined level, provide a high level output in the form of a substantially rectangular output pulse with extremely rapid rise-and-fall times.

There has accordingly been shown and described herein a novel and useful circuit which is not affected by the variations and amplitude of the input signal, either in its transition time or its output.

We claim:

1. A circuit for deriving a uniform output signal for a variable input signal comprising a first and second transistor, one of which is of NPN type and the other of PNP type, each having an emitter, collector and base, means for applying operating potential to said first and second transistors to render them conductive including first and second terminals and a reference potential point, a first resistor connected between said first terminal and said first transistor emitter, means connecting said second terminal to said second transistor emitter, means coupling said first transistor collector to said second transistor base, means coupling said first transistor base to said reference potential point, a second resistor connected between said second transistor collector and said first terminal, an input diode to which input signals are applied, means for directly connecting said input diode to said first transistor emitter with a polarity to conduct current away from said first transistor emitter upon the application of input signals thereto, and means for deriving an output from the collector of said second transistor.

2. A transistor trigger circuit comprising a first transistor having an emitter, collector and base, a first resistor having one end coupled to said first transistor emitter, a second resistor having one end coupled to said first transistor base, a signal input terminal, an input diode directly connected between said input terminal and said first transistor emitter, a second transistor having an emitter, collector and base, means including a coupling diode coupling said first transistor collector to said second transistor base, means to prevent said second transistor from saturation including a diode connected between said second transistor collector and said coupling diode, a third resistor connected between said second transistor collector and the other end of said first resistor, means for applying operating potential to said first and second resistor other ends and to said second transistor emitter, an output terminal connected to said second transistor collector, and means for clamping said output terminal to a desired potential value in the absence of an output from said collector.

3. A trigger circuit comprising a first transistor having an emitter, collector and base, a first resistor having one end coupled to said first transistor emitter, a second resistor having one end coupled to said first transistor base, a signal input terminal, an input diode directly connected between said input terminal and said first transistor emitter, a second transistor having an emitter, collector and base, a third resistor connected between said second transistor collector and said first resistor other end, means coupling said first transistor collector to said second transistor base including a fourth resistor and a diode connected in series therewith, a feedback resistor connected between said second transistor collector and said first transistor base, means for applying operating potential to said first and second resistor other ends and to said second transistor emitter, an output terminal connected to said second transistor collector, and means for clamping said output terminal to a desired potential value in the absence of an output from said collector.

4. A NOR logic circuit comprising a first transistor having an emitter, collector and base, first and second resistors respectively connected to said first transistor emitter and base, a plurality of signal input terminals, a plurality of diodes respectively connected between said plurality of input terminals and said first transistor emitter, a second transistor having an emitter, collector and base, a first diode connected between said second transistor base and emitter, a third resistor connected to said second transistor collector, a fourth resistor connected between said first transistor base and said second transistor collector, a fifth resistor having one end connected to said first transistor collector, a second diode connected between said fifth resistor other end and said second transistor collector, a third diode connected between said fifth resistor other end and said second transistor base, means for applying operating potential for said transistors to said first, second, and third resistors and said second transistor emitter, means including a sixth resistor for applying a cutoff bias to said second transistor base, an output terminal connected to said second transistor collector, and means for clamping said output terminal to a desired potential value in the absence of an output from said collector.

5. A NOR logic circuit as recited in claim 4 where one of said first and second transistors is of the NPN type and the other is of the PNP type.

References Cited in the file of this patent

UNITED STATES PATENTS

| | | |
|---|---|---|
| 2,838,664 | Wolfendale | June 10, 1958 |
| 2,843,761 | Carlson | July 15, 1958 |
| 2,849,626 | Klapp | Aug. 26, 1958 |
| 2,860,258 | Hall | Nov. 11, 1958 |
| 2,903,604 | Henle | Sept. 8, 1959 |
| 2,947,882 | Chou | Aug. 2, 1960 |
| 2,976,428 | Parkhill | Mar. 21, 1961 |